Jan. 21, 1964 V. J. FIORE 3,118,476
SHAPER FOR SHAPING CONICAL TIPS ON WOOD PILES
Filed April 6, 1962 4 Sheets-Sheet 1

INVENTOR.
Vincent J. Fiore
BY
Irving Seidman
ATTORNEY

Jan. 21, 1964 V. J. FIORE 3,118,476
SHAPER FOR SHAPING CONICAL TIPS ON WOOD PILES
Filed April 6, 1962 4 Sheets-Sheet 2

INVENTOR.
Vincent J. Fiore
BY
ATTORNEY

Jan. 21, 1964   V. J. FIORE   3,118,476
SHAPER FOR SHAPING CONICAL TIPS ON WOOD PILES
Filed April 6, 1962   4 Sheets-Sheet 3

INVENTOR.
Vincent J. Fiore
BY
ATTORNEY

Jan. 21, 1964 V. J. FIORE 3,118,476
SHAPER FOR SHAPING CONICAL TIPS ON WOOD PILES
Filed April 6, 1962 4 Sheets-Sheet 4

INVENTOR.
Vincent J. Fiore
BY
Irving Seidman
ATTORNEY

United States Patent Office 3,118,476
Patented Jan. 21, 1964

3,118,476
SHAPER FOR SHAPING CONICAL TIPS ON WOOD PILES
Vincent J. Fiore, New York, N.Y., assignor to Foundation Specialties, Inc., a corporation
Filed Apr. 6, 1962, Ser. No. 185,683
11 Claims. (Cl. 144—30)

This invention relates in general to a shaper, and more specifically to a shaper or sharpener adaptable for shaping tapering or conical tips on the ends of a wood pile.

Because of the very nature of wood piles, their sizes and cross-sectional shape vary one from another. For this reason it is necessary to shape the ends of the piles in order to fit them with the necessary metallic driving shoe in preparation for driving the same into the ground.

As such driving shoes are generally formed in certain standard sizes, it becomes necessary to shape the ends of the piles, falling within a given range of sizes, to a standard dimension for receiving a given standard tip. Heretofore, it had been customary to shape the ends of the wood piles manually with either an ax or an adz. This hand method of cutting and shaping the ends of wood piles is tedious, time-consuming, and relatively expensive because of the large amount of labor required. Further, such hand cutting was unsatisfactory for the reason that more or less than the required amount of material was likely to be removed from the ends of the piles. This would subsequently result in an ill-fitted driving shoe or tip that could and would frequently result in difficulty in the subsequent driving operation of the pile.

Therefore an object of this invention is to provide a shaper to facilitate the shaping of the ends of wooden piles of varying sizes with a uniformly shaped conical tip which is sized to snugly receive a given size driving tip.

Still another object is to provide a shaper adaptable for either power or manual operation in shaping the end of a pile with a minimum of effort.

Still another object is to provide a shaper for shaping conical tips on wood piles that is relatively simple in structure, positive in operation and which is easy and inexpensive to operate.

Other features and advantages will become more readily apparent when considered in view of the drawings and description thereof in which.

Figure 1:
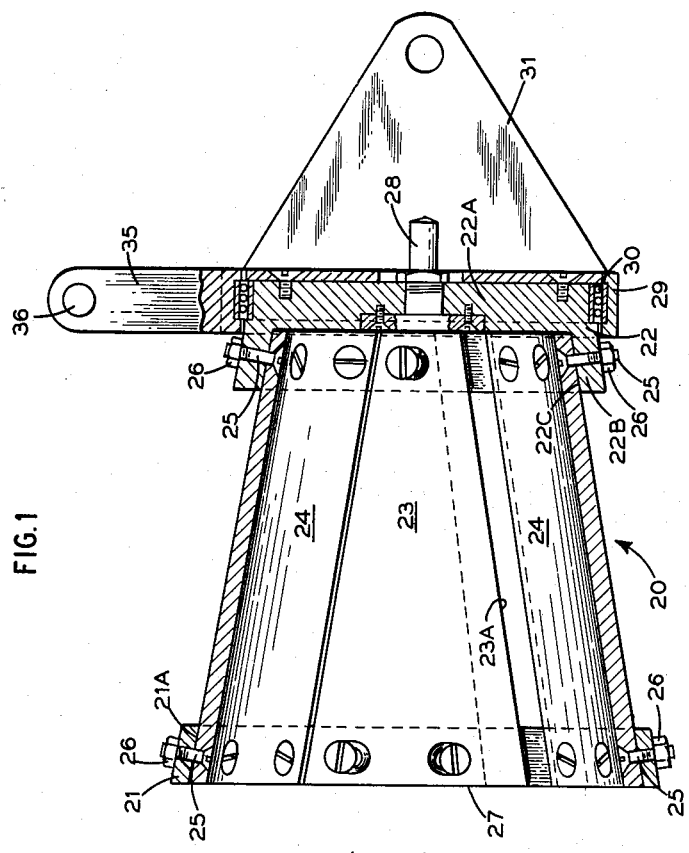
FIG. 1 is a sectional side view of the shaper of this invention.

Referring to the drawing there is shown in FIGS. 1 to 4 a novel shaper or construction 20 which is particularly adaptable for the shaping of conical tips on the end of a wooden pile. Essentially the shaper 20 comprises spaced apart front and rear mounting rims 21 and 22, respectively. As shown, the front mounting rim 21 comprises a circular hoop having a tapering inner wall surface 21A. The rear mounting rim 22 comprises a circular drive plate 22A having a forwardly extending flange 22B circumscribing the periphery thereof. Accordingly, the inner wall surface 22C of the flange is provided with an incline or taper corresponding to the inner wall 21A of the front rim 21. As shown, the diameter of the front rim 21 is greater than that of the drive plate, and the respective rims 21, 22 being concentrically disposed along the longitudinal axis of the shaper 20.

Interconnected between the concentrically disposed front rim 21 and the circular flange 22B are a pair of oppositely disposed cutting blades 23 each provided with a cutting edge. Interdisposed between the cutting blades 23 on each side is a guide plate 24. As shown, the alternately arranged guide plates 24 and cutting blades 23 are fixed at their respective ends to the front rim 21 and flange 22B by a threaded bolt 25 and nut 26.

Figure 2:
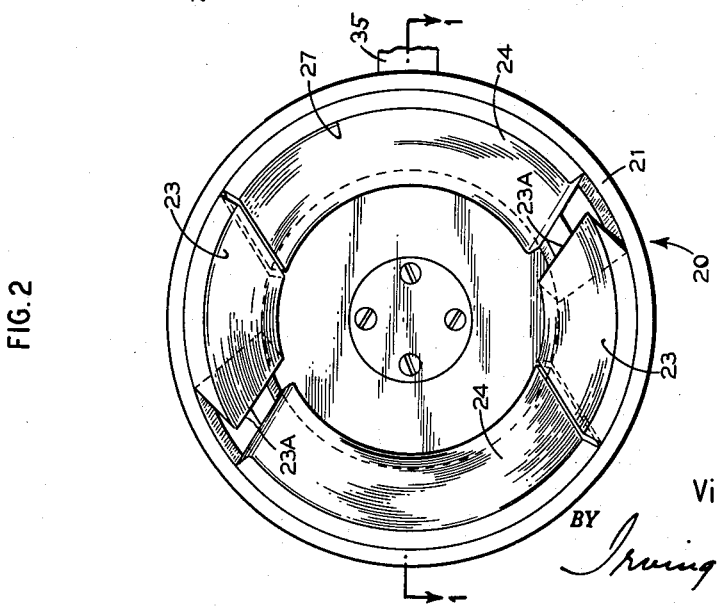
FIG. 2 is a front end view of the shaper of FIG. 1.
Figure 3:
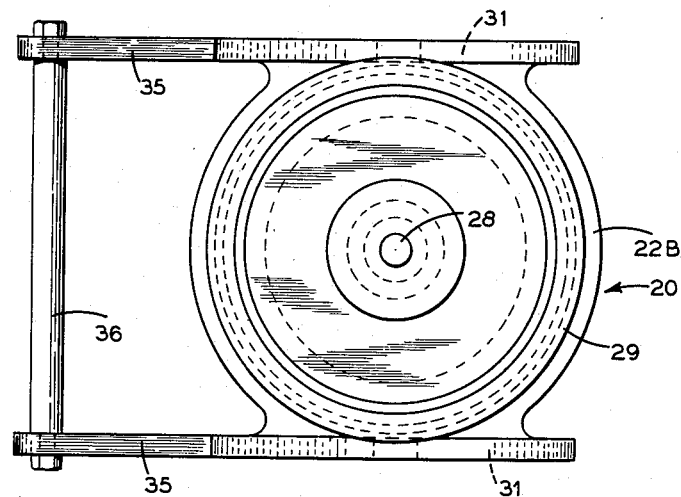
FIG. 3 is a rear end view of the shaper of FIG. 1.

As shown in FIG. 2, the cutting edge 23A of blade 23 extends slightly beyond, i.e. radially inwardly, of the adjacent guide plate 24, and thus provides the bite necessary to accomplish the cutting operation.

Figure 4:
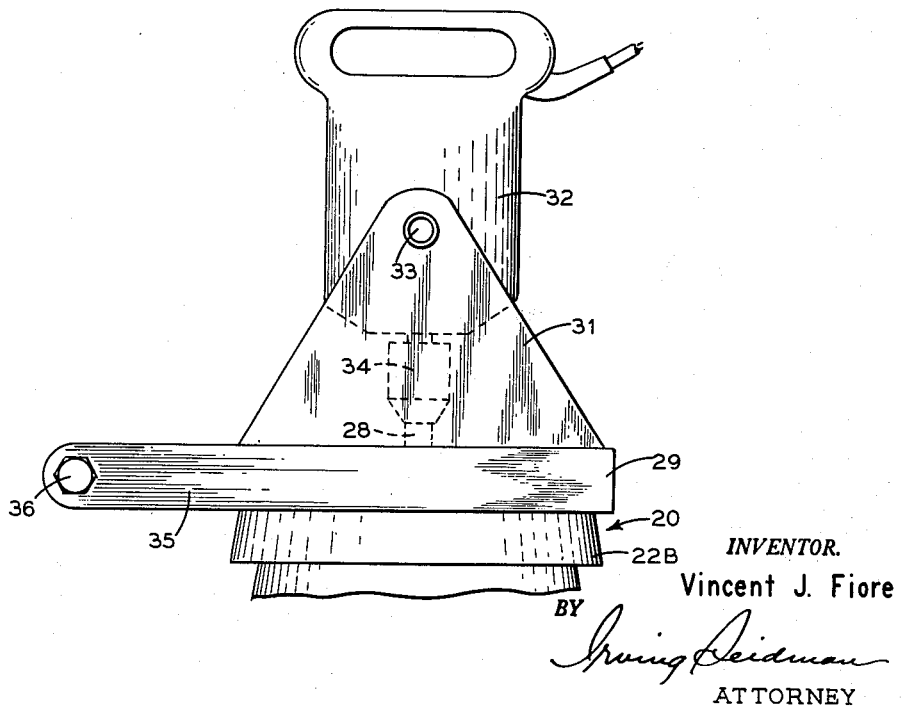
FIG. 4 is a fragmentary side rear end view of the shaper with power means attached.

In accordance with this invention the cutting operation is attained by rotating the cutting blades 23 relative to the wood pile which is inserted into the open end 27 of the shaper 20. In the form of the invention illustrated in FIGS. 1 to 4, the drive plate 22A has connected thereto a drive spindle 28 extending to the rear thereof. Rotatably journaled about and relative to the driving plate 22A is a handle ring 29. As shown, the handle ring 29 is mounted to the drive plate for relative rotation, and a suitable ball bearing race 30 may be positioned between the handle ring 29 and the drive plate 22A to minimize friction. Extending rearwardly of the handle ring 29 from opposed portions thereof are standards 31 to define a yoke for supporting therebetween a suitable power tool 32 for driving the shaper 20. As shown in FIG. 4 a heavy duty electric hand drill is a suitable tool 32 and it is mounted between standards 31 on trunnions 33. The chuck 34 of the drill 32 is adapted to receive the drive spindle 28 of the drive plate 22A as shown in FIG. 4. Thus, when the drill 32 is energized, the drill chuck 34 fixed to spindle 28 will effect rotation of the shaper 20. It will be understood that an air or gas driven drill may be utilized where electricity is not available.

To facilitate holding the shaper 20 during a shaping operation a pair of opposed handle extensions 35 project laterally from the handle ring 29. Connected between handle extensions 35 is a handle bar 36. Thus as shown in FIG. 1, the shaper 20 can be steadied by grasping the handle bar 36 with one hand, while the drill 32 and axial pressure can be applied with the other hand. Because the shaper 20 is mounted for relative rotation with respect to the handle ring 29, it will be apparent that in operation the shaper 20 is rotated independently of the handle ring 29. Thus a cutting operation can be simply and quickly performed with a minimum of effort. Furthermore the conical tip so formed is uniform for all piles within a given range of sizes, regardless of the initial pile size. Also the pile tip can be shaped for perfect fit with a suitable drive shoe every time.

Figure 5:
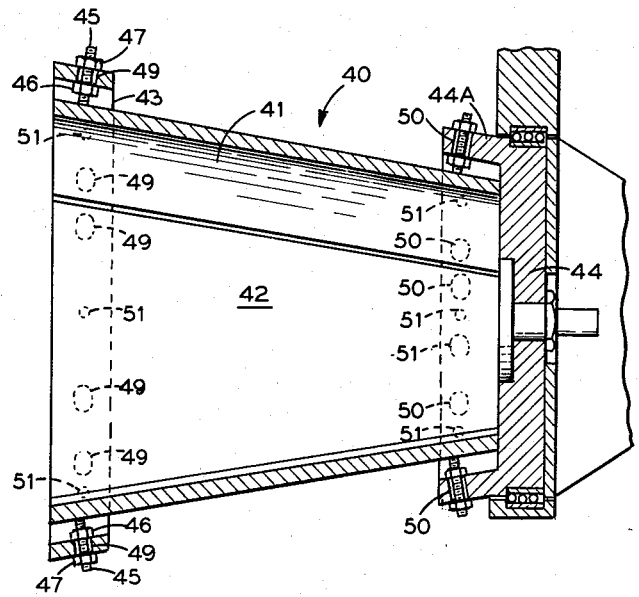
FIG. 5 is a sectional side view of a modified embodiment.
Figure 6:
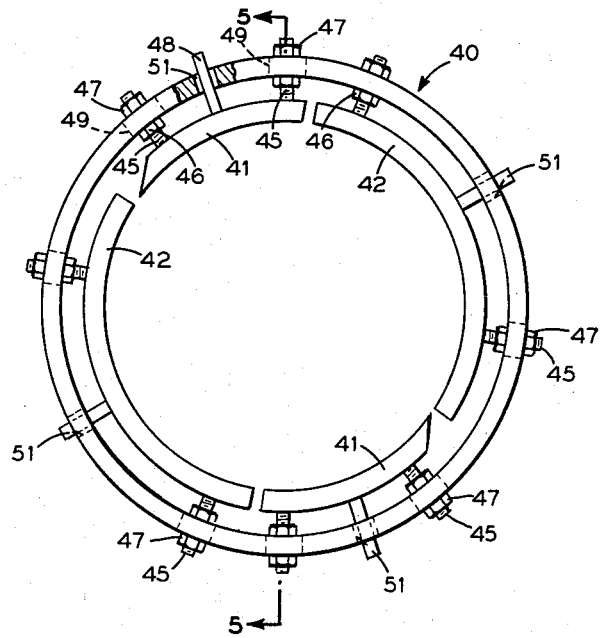
FIG. 6 is a front end view of the shaper of FIG. 5.

FIGS. 5 and 6 illustrate a modified shaper 40 of this invention. This form of the invention is similar to the shaper 20 of FIGS. 1 to 4 described, except that the cutting blades 41 and guide plate 42 are adjustably mounted so as to accommodate for a greater variety of pile sizes, and also the blades 41 and guide 42 are rendered adjustable to vary the degree of taper desired for a given point to be shaped on the end of a pile.

In this form of the invention the front rim 43 and rear drive plate 44 are constructed substantially as hereinbefore described. As shown in FIGS. 5 and 6 the guide plates and blades 41 and 42, respectively, are adjustably mounted at their respective ends to the front rim 43 and rear flange 44A by means of threaded studs 45 and cooperating nuts 46, 47.

In accordance with this form of the invention each blade 41 and guide plate 42 has integrally connected thereto at each end a pair of threaded studs 45 and a guide pin 48 disposed intermediate therebetween. Circumferentially spaced about the front rim 43 and rear flange 44A are cooperating pairs of elongated slots 49, 50, respectively, each adapted to receive a stud 45 of the respective blades 41 or guide plate 42. Disposed between slots 49, 50, respectively, is a round hole 51 for receiving the guide pin 48.

To position the ends of the respective blades 41 and guide plates 42 relative to its connected front rim 43 and rear flange 44A are a pair of nuts 46 and 47, one of which is disposed on either side of the respective rim 43 and rear flange 44A. Thus by taking up or letting down the nuts on their respective studs, the inclination of the respective blades 41 and cooperating guide plates 42 and/or the diameter or size of pile receivable therein can be adjusted accordingly. Thus the shaper 40 of this embodiment offers maximum versatility. Because the guide plates 42 and cutting blades 41 are individually adjustable, it will be apparent that with the construction described the bite of the shaper can likewise be varied or adjusted as desired.

The drive means, the support therefor, and handle for the embodiment (FIGS. 5 and 6) are similar to that described with reference to FIGS. 1 to 4, and therefore need not be further described.

The operation of this shaper 40 is similar to that hereinbefore described with the exception that the blades 41 and guide plates 42 are rendered readily adjustable.

Figure 7:
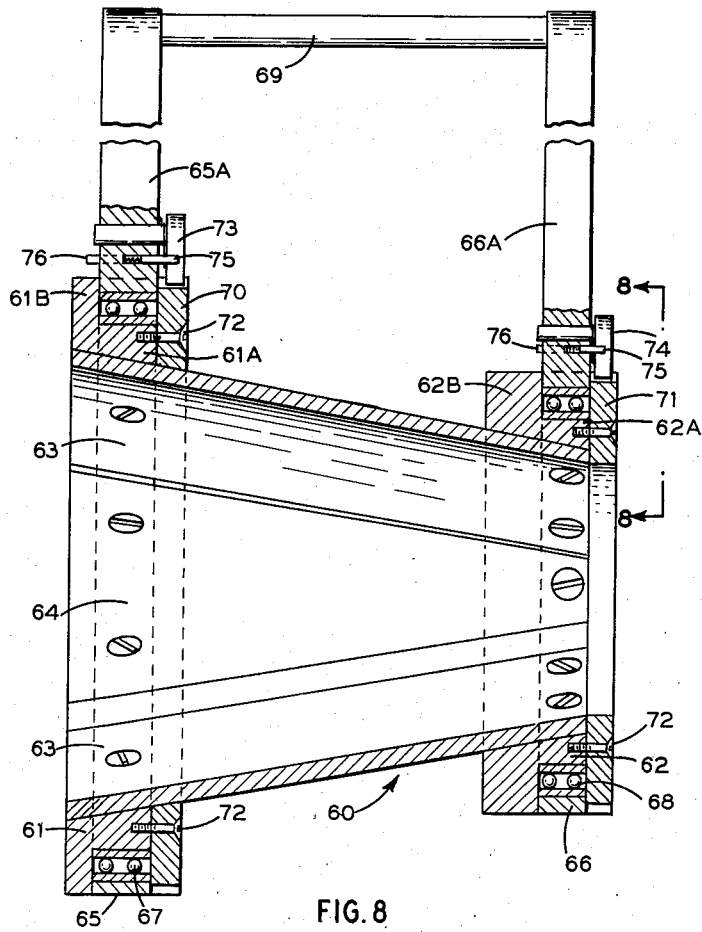
FIG. 7 is a sectional side view of still another embodiment of the invention.
Figure 8:
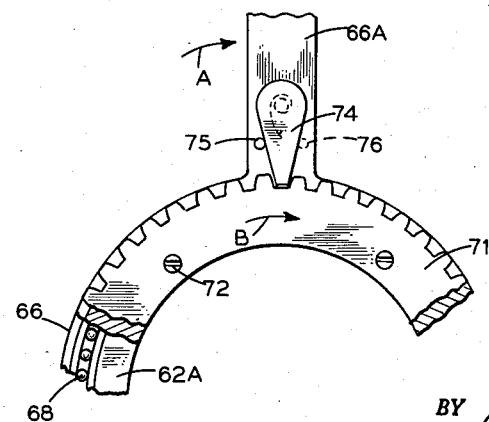
FIG. 8 is a fragmentary rear end view taken along line 8—8 of FIG. 7.

FIGS. 7 and 8 are directed to still another embodiment of the invention. The shaper 60 of this embodiment differs from that described with reference to FIGS. 1 to 4 and to FIGS. 5, 6 in that shaper 60 is constructed for driving by hand operation. As shown, shaper 60 includes a front mounting rim 61 and a rear mounting rim 62. The front rim 61 comprises a ring 61A having a laterally extending flange 61B disposed about the entire periphery thereof. The rear mounting rim 62 is similarly constructed of a ring portion 62A and flange portion 62B, the ring 61A of the front rim 61 having a greater diameter than that of the rear ring 62A. Interconnected between the front and rear rims 61 and 62 are the opposed cutting blades 63 with the guide plates 64 disposed therebetween. In the forms of the invention herein described and illustrated, the respective cutting blades and cooperating guide plates each occupy substantially one quadrant of the mounting rim construction. However, it will be understood that the blades and cooperating guide plates may be otherwise proportioned.

In this form the blades 63 and guides 64 are mounted to their respective rims 61 and 62 in the manner herein described with reference to FIGS. 1 to 4. If adjustment of the blades 63 and plates 64 is desired, they may be mounted to their respective rims 61 and 62 as described with reference to FIGS. 5 and 6.

Circumscribing each ring portion 61A and 62A of the front and rear rims 61, 62, respectively, is a handle ring 65 and 66, respectively. In accordance with this invention each handle ring 65, 66 is mounted for relative rotation with respect to the respective mounting rims 61 and 62. To minimize friction therebetween a suitable bearing 67, 68 may be interposed between handle rings 65 and 66 and their respective rims 61 and 62.

Extending beyond each handle ring 65 and 66 and integrally formed therewith is a handle extension 65A, 66A. Between handle extensions 65A and 66A there is journaled a handle bar 69.

In this embodiment a ratchet gear ring 70, 71 is fixed to the ring portions 61A, 62A of the respective front and rear rims 61 and 62 by suitable fasteners 72. Pivotally connected to each handle extension 65A, 66A is a ratchet pawl 73, 74 for engaging the ratchet teeth of its respective gear ring 70, 71.

To effect driving, a retractable stop pin 75, 76 is disposed on either side of each pawl 73, 74. Thus depending on which pin 75 or 76 is protracted, rotation of the shaper 60 can be effected in either a clockwise or counterclockwise direction.

For example, in the form of the invention shown in FIGS. 7 and 8, it will be apparent that with pawl and ratchet teeth engaged, an application of a force in the direction of arrow A will effect rotation of the shaper 60 clockwise as indicated by arrow B, being prevented from pivoting due to the stop pin 75. Thus driving must occur when a force is applied in the direction of arrow A. At the end of each stroke the handle 69 and associated pawls 73, 74 are returned counterclockwise to initial start position. Since stop pin 76 is retracted and not in the way of pawls 73, 74 the handle rings 65, 66 are free to rotate counterclockwise relative to the mounting rims 61, 62, as the pawls 73, 74 are free to pivot relative to the handle extensions and override the ratchet teeth on the return stroke. Thus handle rings can be returned to initial position without effecting counterclockwise rotation of the shaper 60. With repeated back and forth ratchet type motion, the shaper 60 described can be easily adapted for manual operation in field work where power is not readily available. If desired a spring may be employed to bias the pawls against the operatable stop pins.

To reverse the direction of driving, pin 75 is retracted and pin 76 is protracted. Thus the operation can be reversed to effect counterclockwise rotation.

From the foregoing description it will be apparent that the forms of the shaper herein described are relatively simple and positive in operation, easily constructed, and relatively inexpensive to fabricate. They can be readily operated by a single individual, and uniform tapers can be formed thereby so as to always insure a proper fit with a driving shoe or tip. Thus with the shapers herein disclosed a tedious, expensive and time-consuming operation of the heretofore ax or adz shaping the end of a wood pile is eliminated.

While the instant invention has been disclosed with reference to a particular embodiment thereof, it is to be appreciated that the invention is not to be taken as limited to all of the details thereof as modifications and variations thereof may be made without departing from the spirit or scope of the invention.

What is claimed is:

1. A device for tapering the tip of a wood pile comprising spaced front and rear circular rims, said rims being concentrically disposed along the longitudinal axis of said device, said front rim having a greater diameter than said rear rim, a pair of oppositely disposed cutting blades connected between said front and rear rims, oppositely disposed guide plates connected between said rims for occupying the spaces between opposed blades, means for driving said rear rim to effect rotation of said cutting blades fixed thereto during a shaping operation, and handle means journaled to said rear rim whereby said rear rim is free to rotate relative thereto.

2. A device for tapering the tip end of a wood pile comprising spaced front and rear circular rims, said rims being concentrically disposed along the longitudinal axis of said device, said front rim having a greater diameter than said rear rim, a pair of oppositely disposed cutting blades connected between said front and rear rims, oppositely disposed guide plates connected between said rims for occupying the space between opposed blades, a handle ring journaled about said rear rim so as to permit relative rotation therebetween, opposed yoke standards extending from said ring in an axial direction, a power operated tool to effect rotation of said rear rim connected between said standards for supporting the same, a pair of opposed handle extensions extending laterally of said ring, and a handle bar extended between said extensions to provide a hand grip for steadying said device during a cutting operation.

3. A device for tapering the tip of a wood pile to shape the same for facilitating the attachment thereto of a ferrule type driving shoe, said device comprising a front circular rim having a tapering internal wall surface, a rear drive plate spaced from said front rim, said drive plate having a forwardly extending circular flange, said flange having a tapering internal wall surface similar to that of said front rim, said front rim having a diameter greater than that of said flange, a pair of oppositely disposed cutting blades connected to and between said front rim and flange of said rear drive plate, oppositely disposed guide plates connected to said front rim and flange of said drive plate to occupy the space between cutting blades, a spindle fixed to said drive plate and extending rearwardly thereof, a power operated drive means adapted to engage said spindle for rotating said drive plate to effect the cutting operation of said device, and a handle means connected about said drive plate to provide a handle for said device during a cutting operation.

4. A device for tapering the tip end of a wood pile to shape the same for facilitating the attachment thereto of a ferrule type driving shoe, said device comprising a front circular rim, a rear drive plate spaced from said front rim, said drive plate having a forwardly extending circular flange, said front rim having a diameter greater than that of said flange, a pair of oppositely disposed cutting blades connected to and between said front rim and flange of said rear drive plate, oppositely disposed guide plates connected between said front rim and flange of said drive plate to occupy the space between cutting blades, a spindle fixed to said drive plate to extend rearwardly thereof, a handle ring journaled about said drive plate so as to permit relative rotation therebetween, said handle ring including axially extending opposed yoke standards, power operated drive means adapted to engage said spindle for rotating said drive plate to effect the cutting operation of said blades connected between said standards, a pair of handle extensions extending laterally of said ring, and a handle bar extended between said handle extension to provide a hand grip for steadying said device during a cutting operation.

5. A device for tapering the tip end of a wood pile to shape the same for facilitating the attachment thereto of a ferrule type driving shoe, said device comprising a front circular rim having a tapering internal wall surface, a rear drive plate spaced from said front rim, said drive plate having a forwardly extending circular flange, said flange having a tapering internal wall surface similar to that of said front rim, said front rim having a diameter greater than that of said flange, a pair of oppositely disposed cutting blades connected to and between said front rim and flange of said rear drive plate, oppositely disposed guide plates connected between said front rim and flange of said drive plate to occupy the space between cutting blades, a spindle fixed to said drive plate to extend rearwardly thereof, a handle ring journaled about said drive plate so as to permit relative rotation therebetween, said handle ring including axially extending opposed yoke standards, power operated drive means adapted to engage said spindle for rotating said drive plate to effect the cutting operation of said blades connected between said standards, a pair of handle extensions extending laterally of said ring, and a handle bar extended between said handle extensions to provide a hand grip for steadying said device during a cutting operation.

6. A device for tapering the tip end of a wood pile to shape the same for facilitating the attachment thereto of a ferrule type driving shoe, said device comprising a front circular rim, a rear drive plate spaced from said front rim, said drive plate having a forwardly extending circular flange, said front rim having a diameter greater than that of said flange, a pair of oppositely disposed cutting blades connected to and between said front rim and flange of said rear drive plate, oppositely disposed guide plates connected between said front rim and flange of said drive plate to occupy the space between cutting blades, means for rendering said blades and guide plates adjustable to vary the degree of taper thereof, a spindle fixed to said drive plate to extend rearwardly thereof, a handle ring journaled about said drive plate so as to permit relative rotation therebetween, said handle ring including axially extending opposed yoke standards, power operated drive means adapted to engage said spindle for rotating said drive plate to effect the cutting operation of said blades connected between said standards, a pair of handle extensions extending laterally of said ring, and a handle bar extended between said handle extensions to provide a hand grip for steadying said device during a cutting operation.

7. A shaper adapted for shaping conical tips on the end of wood piles comprising spaced front and rear mounting rims, said front mounting rim having a diameter greater than said rear mounting rim, a pair of alternately disposed cutting blades and guide plates circumferentially spaced and interconnected between said front and rear mounting rims, a handle ring rotatably journaled about each of said front rim and rear rim, a handle extension connected to each handle ring, a handle bar connected between said handle extensions, a ratchet connected to each of said mounting rims, and a ratchet pawl connected to each of said handle extensions for engaging said ratchet whereby engagement of said pawls with its respective ratchet effects rotation of said cutting blades upon rotation of said handle.

8. The invention as defined in claim 7 and including means for reversing the driving of said shaper.

9. A manually driven shaper for shaping conical tips on the end of wood piles for facilitating the attchment thereto of a ferrule type driving shoe, said shaper comprising spaced front and rear mounting rims, said front mounting rim having a diameter greater than said rear mounting rim, a pair of alternately disposed cutting blades and guide plates circumferentially spaced and interconnected between said front and rear mounting rims, a handle ring rotatably journaled about said front rim and rear rim, bearing means interdisposed between said handle rings and its respective mounting rim, handle extension laterally connected to each handle ring, a handle bar connected between said handle extensions; a ratchet ring having ratchet teeth circumferentially spaced thereabout connected to each of said mounting rims, a ratchet pawl connected to each of said handle extensions for engaging the teeth of said ratchet ring whereby engagement of said pawls with its respective ratchet effects driving of said shaper upon reciprocating movement of said handle, and a pair of stop pins disposed on either side of the respective pawls, said pins being operative to effect the direction of rotation of said shaper.

10. A shaper adapted for shaping a conical tip on the end of a wood pile comprising spaced apart front and rear mounting rims, said front mounting rim having a diameter greater than that of said rear rim, a pair of alternately disposed cutting blades and guide plates circumferentially spaced and interconnected between said front and rear mounting rims, means for adjusting said blades and guide plates for adjusting the taper of the cutting angle of said blades, a handle ring journaled about said rear mounting rim, and means for driving said shaper to effect rotation thereof for performing the cutting operation.

11. A device for tapering the tip of a wood pile to shape the same for facilitating the attachment thereto of a ferrule type driving tip comprising a front circular rim having a tapering internal wall surface, a rear drive plate spaced from said front rim, said drive plate having a forwardly extending circular flange, said flange having a tapering internal wall surface similar to that of said front rim; said front rim having a diameter greater than that of said flange, each of said front rim and rear flanges having pairs of elongated slots extending therethrough, a pair of oppositely disposed cutting blades, said cutting blades each having a pair of threaded bolts connected thereto, adjacent the ends thereof, said bolts being adapted to register with a pair of said slots in the respective front rim and rear flange, a nut threaded to said bolts to effect adjusting of said blades, a guide plate disposed between said cutting blades; said guide plates being connected to said front rim and flanges of rear drive plate, a spindle fixed to said drive plate and extending rearwardly thereon, a power operated drive means adapted to engage said spindle for rotating said drive plate to effect the cutting operation of said blades, and a handle means connected about said drive plate to provide a grip for said device during a cutting operation.

References Cited in the file of this patent

UNITED STATES PATENTS

| | | |
|---|---|---|
| 362,638 | Laycock | May 10, 1887 |
| 562,128 | Frost | June 16, 1896 |
| 895,287 | McDonald | Aug. 4, 1908 |
| 2,048,538 | Clabby | July 21, 1936 |
| 2,185,002 | Pack | Dec. 26, 1939 |
| 2,204,516 | Stone | June 11, 1940 |